March 10, 1942.    J. CHRISTIAN    2,276,159
HYDRAULIC STEERING MECHANISM
Filed Jan. 24, 1939    2 Sheets-Sheet 1
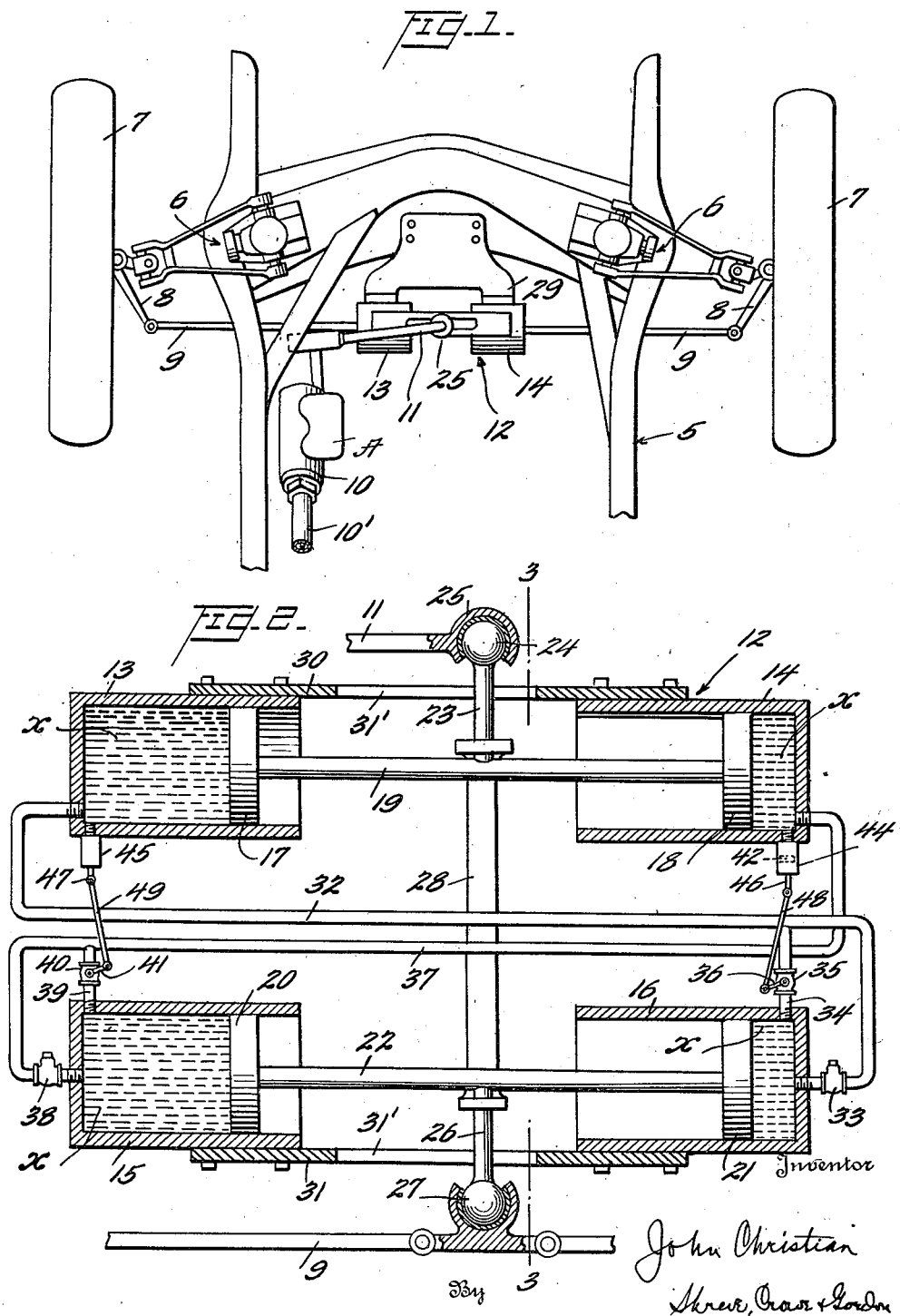
Inventor
John Christian
By Shreve, Crane & Gordon
Attorneys March 10, 1942.  J. CHRISTIAN  2,276,159
HYDRAULIC STEERING MECHANISM
Filed Jan. 24, 1939  2 Sheets—Sheet 2
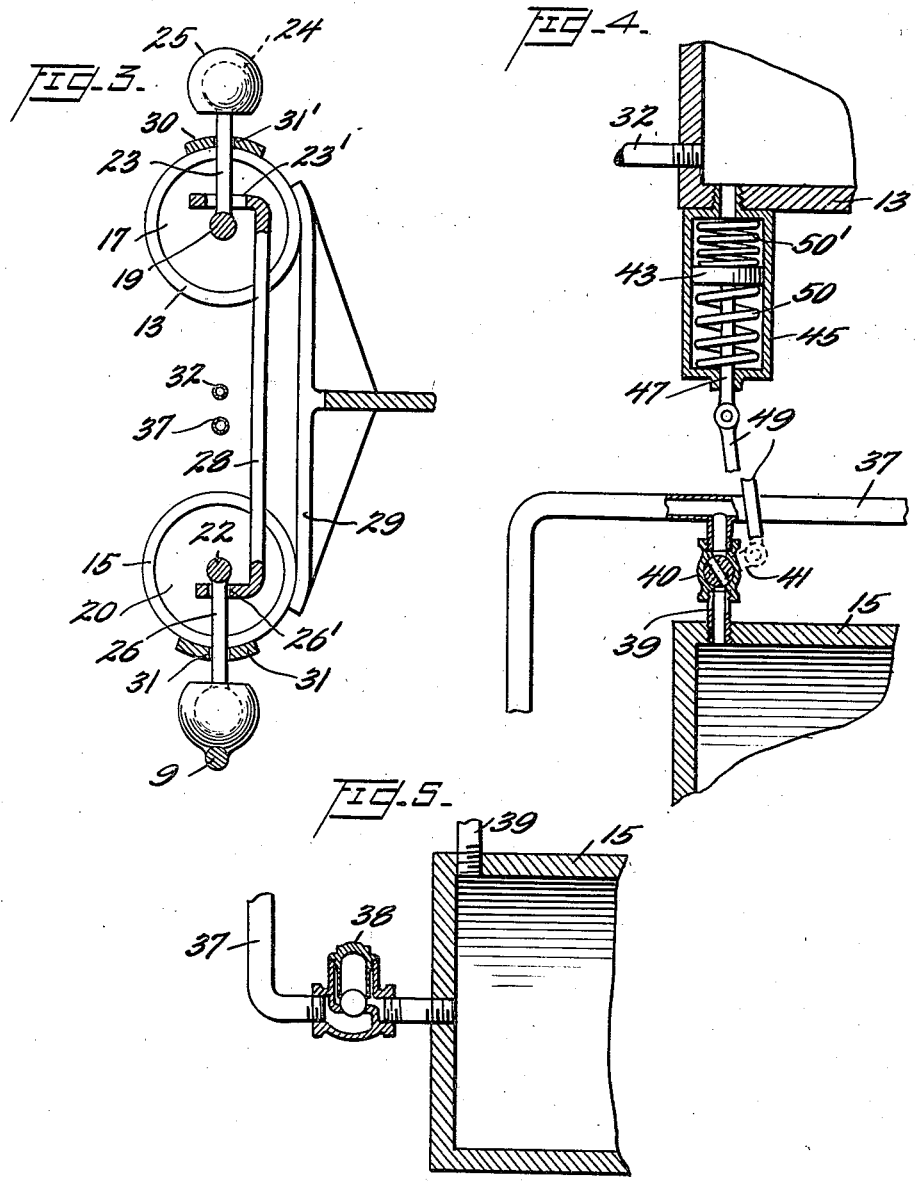
Inventor
John Christian
Shreve, Crowe & Gordon
Attorneys Patented Mar. 10, 1942

2,276,159

UNITED STATES PATENT OFFICE 2,276,159

HYDRAULIC STEERING MECHANISM

John Christian, Baton Rouge, La.

Application January 24, 1939, Serial No. 252,672

5 Claims. (Cl. 280—87)

This invention relates to an improvement in a steering mechanism for motor vehicles, and has particular reference to a steering mechanism employing a hydraulic medium for transmitting motion from the steering wheel to the front wheels.

Broadly the invention contemplates the provision of a hydraulic mechanism interposed between the hand steering wheel and the conventional tie rod controlling the front wheels.

It is an object of the present invention to provide such a mechanism which serves to transmit a positive movement to the front wheels, while at the same time preventing the transmission of strains and shocks from the steered wheels caused by road imperfections so commonly present in the conventional steering mechanisms now in use. The structure further serves to properly balance the front wheels by avoiding any back motion or wobbling, thus avoiding any abnormal motion of the steering wheel.

Another important object of this invention is the provision of a steering apparatus for automobiles and the like including a hydraulic medium interposed between the steering wheel and the front wheel structure adapted to effect transmission of motion from the steering wheel to said front wheels and to prevent reverse transmission of motion from said wheels to the steering wheel, and means for continuing the transmission of motion from said steering wheel to the front wheels should the hydraulic medium become inoperative.

A further important object of this invention is the provision of a hydraulic mechanism intermediate the steering wheel and front wheels of an automobile and the like, adapted to effect and permit the transmission of motion from the steering wheel to the front wheels and, not only preventing the reverse transmission of motion from the front wheels to the steering wheels, but at the same time preventing any back motion and maintaining the wheels in their direction of travel when coming into sudden contact with an obstruction in their path of travel.

Other and important objects of this invention will present themselves during the course of the following description, reference being had to the accompanying drawings. In the drawings:

Fig. 1 is a fragmentary plan view of the front part of an automobile chassis showing the invention in use;

Fig. 2 is a vertical longitudinal section through the control cylinders and associated parts;

Fig. 3 is a section on line 3—3 of Fig. 2;

Fig. 4 is a section through a valve and control cylinder therefor; and

Fig. 5 is a detail section through a check valve associated with the invention.

Referring specifically to the drawings, the numeral 5 designates generally the chassis of a motor vehicle, embodying a front axle construction 6, front or steering wheels 7, steering knuckles 8, and tie rod 9. A conventional worm gear housing 10, mounted on steering wheel post 10' carrying a steering wheel (not shown), contains the usual steering worm and segment to which is connected the drag link 11. While the invention is shown as being applied to a chassis construction including a knee action mounting, it will be naturally understood that the mechanism is equally applicable to wheel mountings of other constructions.

Referring particularly to Figs. 1 and 2, the numeral 12 designates the control mechanism as a whole, embodying upper and lower pairs of cylinders 13—14 and 15—16. Movable in the cylinders 13 and 14 are pistons 17 and 18 connected by a common connecting rod 19 so that the pistons move in unison. Movable in the cylinders 15 and 16 are pistons 20 and 21 connected by a common connecting rod 22 to insure the pistons moving in unison. The rod 19 is provided with a rigid upstanding arm 23 having a ball end 24. Engageable with the ball 24 is a socket member 25 forming a part of the drag link 11. Thus, any movement of the steering wheel will be imparted to the pistons 17 and 18 through the medium of this ball and socket connection.

The connecting rod 22 is likewise provided with a rigid arm extension 26 having a ball and socket connection 27 with a tie rod 9. It will be obvious, therefore, that movement of the pistons 20 and 21 will impart a similar movement to the tie rod 9.

In order to retain a driving connection from the steering wheel and post structure 10' to the front wheels 7 by maintaining an operative connection between the arms 23 and 26 should the hydraulic fluid X become dissipated, a generally U-shaped link 28 connects said arms by having one end of said link rigidly secured to arm 26 as at 26' and the other end loosely connected to arm 23 by means of opening 23' formed therein of slightly larger diameter than said arm 23 extending therethrough, so that sufficient play will be afforded to permit ample movement of said arm to effect driving connection through said fluid medium without affecting said link, the latter, however, functioning to maintain without interruption the driving connection between said arms, upon said hydraulic medium becoming inoperative.

As clearly shown in Figs. 1 and 3, the several cylinders and their associated parts are mounted in a predetermined relation upon a bracket 29, in turn rigidly bolted or otherwise attached to the front axle structure, preferably substantially central thereof. Said supporting bracket 29 is formed with the spaced upper and lower guide plates 30 and 31 formed with slots 31' adapted to receive and positively maintain the arms 23 and 26 extending therethrough and connected to link 11 and tie rod 9, respectively, in proper operating position.

A conduit 32 leads from the closed end of the cylinder 13 to the closed end of the cylinder 16, an inwardly opening check valve 33 being interposed in the line preferably adjacent said cylinder. Leading from the conduit 32 to the same end of the cylinder 16 is a by-pass conduit 34, controlled by a rotary valve 35 having an operating handle 36. Leading from the closed end of the cylinder 14 is a conduit 37 having communication with the cylinder 15, an inwardly opening check valve 38 being interposed in the line preferably adjacent said cylinder. A by-pass conduit 39 leads from the conduit 37 to the cylinder 15, a rotary valve 40 being interposed therein and provided with an operating handle 41. Means are provided for controlling the rotation of the valves during predetermined cycles of operation, comprising pressure actuated pistons 42 and 43 movable in cylinders 44 and 45. Piston rods 46 and 47 project from the cylinders 44 and 45 and have pivotal connection with links 48 and 49 which in turn are pivotally connected with the arms 36 and 41. The pistons 42 and 43 are normally maintained in an intermediate position in the cylinders 44 and 45 by compressible coil springs 50 and 50' arranged upon opposite sides of the pistons. The system including the various cylinders and conduits is completely filled with a non-compressible medium such as oil. As illustrated in Fig. 4, when the pistons 42 and 43 are in their neutral positions or at the top the valves 35 and 40 are closed. Movement of the piston 17 in compression direction forces piston 43 down opening valve 40, and simultaneously therewith the suction stroke of cylinder 18 moves piston 42 to its top position expelling oil from cylinder 44 into cylinder 14, valve 35 remaining closed; and movement of pistons 17 and 18 in the opposite direction causes the alternate opening of valve 35 and movement of its associated parts and alternate closing of valve 40 and movement of its associated parts, springs 50 and 50' normally maintaining pistons 42 and 43 in neutral position and valves 35 and 40 closed. It will thus be seen that movement of the steering wheel structure imparted to pistons 17 and 18 in cylinders 13 and 14 effects an automatic control of said valves 35 and 40 dependent upon the direction of their respective compression strokes.

While the operation of the device would seem to be clear from the above description, it might be well to further state as follows:

Assuming the parts to be in neutral or intermediate position, as in Fig. 1, movement of the drag link 11 to the left under the action of the steering wheel imparts a compression stroke to the piston 17 and a suction stroke to the piston 18. The compression in cylinder 13 drives the fluid through the conduit 32, past check valve 33 to the cylinder 16. This tends to drive the piston 21 to the left, but since the piston 20 must of necessity partake of the same movement, it becomes necessary that the fluid in cylinder 15 be relieved, and, while compression is taking place in cylinder 13, piston 43 is being forced to its lowermost position, opening valve 40 and permitting fluid to be by-passed from cylinder 15 to cylinder 14 through conduits 39 and 37. The simultaneous movement of pistons 20 and 21 to the left imparts a like movement to the tie rod 9 and to the wheels 7. The return movement of the pistons 17 and 18 under the action of the drag link 11 causes a reversal of the parts, fluid being forced through the conduit 37 to the cylinder 15, the cylinder 16 being relieved by the opening of by-pass valve 35 permitting the by-passed fluid to flow to the cylinder 13.

When the parts are in neutral position or, as would be the case when the operator is driving in substantially a straight line and when the steering wheel is not being rotated to any great extent, all valves are held closed. As pointed out previously, the check valves 33 and 38 are inwardly opening, hence, fluid cannot pass from the cylinders 15 and 16 through these valves. As will be obvious, therefore, any road shocks transmitted to the tie rod 9 will fail to pass beyond this point, since the pistons 20 and 21 are positively held against movement except when relieved by the action of the drag link 11.

It will further be apparent that the positive control of pistons 20 and 21 prevents said front wheels 7 from changing their direction of travel, by reason of coming into sudden contact with an obstruction, which often causes the vehicle to become out of control and leave the road with disastrous results to both occupants and vehicle. Likewise, said control prevents the force of sudden shocks to the front wheels from reaching the steering wheel which often causes the operator to lose control of the vehicle. These are important safety factors and a further one is the normally inoperative member 28 connecting the arms 23 and 26, but instantly constituting an operative driving connection from the steering wheel to the front wheels and maintaining said driving connection uninterrupted, should for any reason the fluid or hydraulic medium normally constituting the driving connection become dissipated and therefore leaving the driver helpless to guide the vehicle.

From the above it is apparent that I have designed a steering mechanism for self-propelled vehicles and the like, providing a positive motion, without the usual lost motion so prevalent in the conventional steering mechanisms, and definitely avoiding the transmission of road shocks to the driver's wheel, said mechanism embodying a hydraulic means permitting free transmission of movement from the hand steering wheel to the vehicle steering wheels and including two pairs of aligned cylinders the pistons of each pair being connected by a common connecting rod, said connecting rods adapted to move in unison when motion is transmitted thereto from the steering wheel, fluid conduits connecting certain cylinders of the respective pairs, valve means in certain of said conduits automatically operable dependent upon the direction of the application of pressure from said cylinders to preclude transmission of road shocks to said steering mechanism, and normally inoperative means adapted to maintain driving connection between the hand steering wheel and the vehicle steering wheels, should the hydraulic fluid medium become inoperative, such device being simple in construction, comprising few parts, manufacturable at a minimum cost, and efficient for the purposes intended.

Although in practice I have found that the form of my invention illustrated in the accompanying drawings and referred to in the above description as the preferred embodiment is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. In combination a driving and a driven device of a steering mechanism, a hydraulic mechanism interposed between the driving and driven devices, said hydraulic mechanism embodying two sets of pairs of cylinders, pistons operable in the cylinders, piston rods connecting each pair of pistons, connecting arms formed on the rods, the driving device being connected to one rod through the medium of one of said arms, the driven device being connected to the other rod through the other of said arms, guide means for said arms, conduits connecting the opposite cylinders of each set, means controlling the flow of fluid through the conduits from one to the adjacent set of cylinders and from the adjacent set to the other set of cylinders, said means preventing the transmission of motion from the lower to the upper pistons.

2. A hydraulic steering mechanism of the character described comprising a pair of spaced upper cylinders and a pair of spaced lower cylinders, pistons operable in the several cylinders, a common piston rod connecting the pistons of each pair, a conduit connecting each of the upper cylinders with the opposite cylinders of the lower pair, check valves for the intake of each of the lower cylinders, by-pass valves for each of the lower cylinders, and means operable by the movement of the upper pistons for controlling said by-pass valves.

3. A hydraulic steering mechanism comprising an upper and a lower pair of spaced cylinders, pistons operable in the cylinders, a common piston rod for each pair of pistons, means connected with the piston rod of the upper pair for imparting movement thereto, means connecting the piston rod of the lower pair to a tie rod, conduits connecting each of the upper cylinders with the opposite cylinders of the lower pair, check valves for the lower cylinders, by-pass conduits for each of the lower cylinders, valves controlling said by-pass conduits, compression cylinders carried by each of the upper cylinders, pistons operable in the compression cylinders, links connecting said last named pistons with the by-pass valves, each of said compression pistons serving to open its connected by-pass valve when the piston of its upper cylinder is moved to compression position.

4. A hydraulic steering mechanism of the character described comprising a set of spaced primary cylinders and a set of spaced secondary cylinders, pistons operable in the several cylinders, means connecting the pistons of each set adapted to effect their simultaneous movement, a conduit connecting each of the primary cylinders with the opposite cylinders of the secondary set, check valves for the intake of each of the secondary cylinders, by-pass valves for each of the secondary cylinders, and means operable by the movement of the primary pistons for controlling said by-pass valves.

5. A hydraulic steering mechanism of the character described comprising a pair of spaced primary cylinders and a pair of spaced secondary cylinders, pistons operable in the several cylinders, connecting means between the pistons of each pair adapted to effect their simultaneous movement, a conduit for an hydraulic medium connecting each of the primary cylinders with the opposite cylinders of the secondary pair, check valves for the intake of each of the secondary cylinders, by-pass valves for each of the secondary cylinders, means operable by the movement of the primary pistons for controlling said by-pass valves, and a normally inactive link means connecting the piston connections of the primary and secondary pistons adapted to continue without interruption the drive from the primary to the secondary pistons should said hydraulic medium become inoperative.

JOHN CHRISTIAN.